Figure 1:
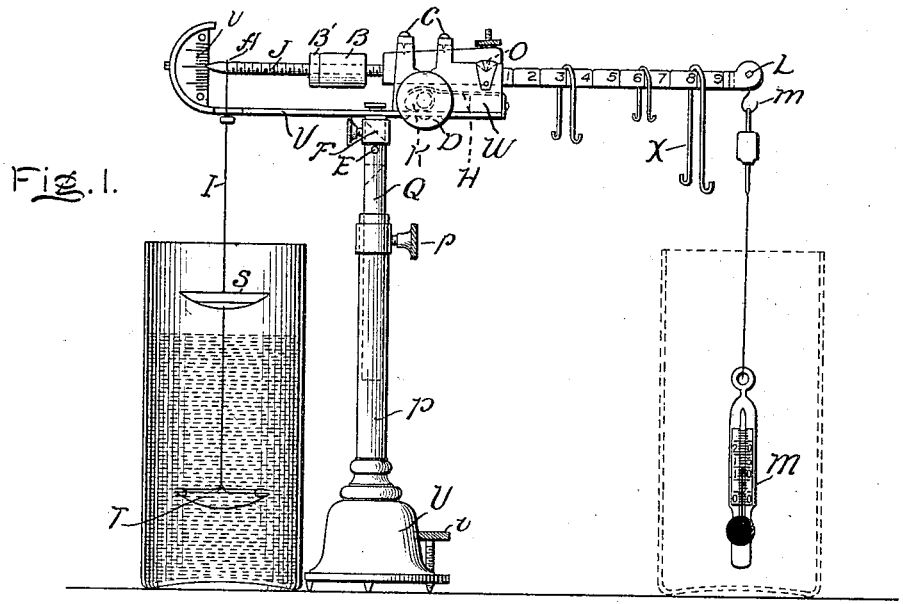

No. 808,421. PATENTED DEC. 26, 1905.
F. M. WILLIAMS.
SPECIFIC GRAVITY BALANCE.
APPLICATION FILED FEB. 7, 1905.

WITNESSES:
George H. Thornton
Edward Williams Jr.

INVENTOR:
Frank M. Williams,
By L. A. Hawkins
Att'y.

UNITED STATES PATENT OFFICE.

FRANK M. WILLIAMS, OF POTSDAM, NEW YORK.

SPECIFIC-GRAVITY BALANCE.

No. 808,421.　　　　Specification of Letters Patent.　　　　Patented Dec. 26, 1905.

Application filed February 7, 1905. Serial No. 244,596.

*To all whom it may concern:*

Be it known that I, FRANK M. WILLIAMS, a citizen of the United States, residing at Potsdam, county of St. Lawrence, State of New York, have invented certain new and useful Improvements in Specific-Gravity Balances, of which the following is a specification.

My invention relates to balances for determining the specific gravity of substances; and its object is to provide a balance of this type comprising a number of useful features not heretofore found in such instruments.

One type of specific-gravity balance well known in the art is known as the "Westphal" balance. This instrument comprises, essentially, a pivoted beam carrying at one end a pointer and at the other a plummet of fixed weight and volume which is immersed in the liquid the specific gravity of which it is desired to measure and its buoyancy in that liquid measured by means of weights or riders adjusted on the pivoted beam.

One feature of my invention consists in arranging a balance of this general type so that it may conveniently be employed for measuring the specific gravity not only of liquids, but of solids as well. I accomplish this by suspending from the opposite end of the beam from that from which the usual plummet is suspended two pans or receptacles, one above the other, adapted to receive the solid to be measured and providing a suitable counterweight readily adjusted. By immersing the lower pan in water or other suitable liquid and by placing the solid first in one pan and then in the other and measuring its weight in each case by means of riders properly adjusted on the opposite end of the beam the loss of weight on immersion in water is quickly and accurately ascertained. From this loss of weight the specific gravity may be calculated in the well-known manner. The range of utility of the balance is thus greatly increased by extending it to the measurement of solids without in any way diminishing its convenience or accuracy in the measurement of the specific gravity of fluids.

Another feature of my invention consists in the supporting means for the lower pan, consisting of a spring-clip which holds the pan firmly and prevents its floating from the support when being immersed.

Another feature of my invention consists in forming the arm from which the pans are suspended with a screw-thread and providing a screw-threaded counterbalance and lock-nut adapted to travel on said arm, whereby an exceedingly close adjustment is conveniently obtained and maintained.

Another feature of my invention consists in a novel arrangement for lifting the pivoted beam from its supporting knife-edges and firmly locking it, so that the pans, plummet, &c., may be lifted off and replaced and the instrument moved about without injury to the knife-edges and without entirely removing the beam from its supporting-standard.

Another feature of my invention consists in a novel arrangement for folding the instrument to render it more portable and easily packed and for firmly locking it when folded.

Other features of my invention will appear from the following specification and will be more specifically pointed out in the appended claims.

My invention will best be understood by reference to the accompanying drawings, in which—

Figure 2:
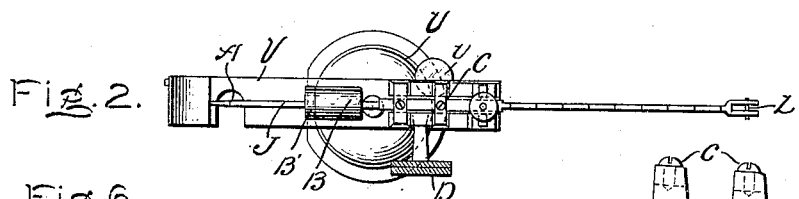
Figure 6:
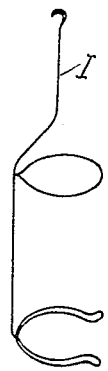
Figure 3:
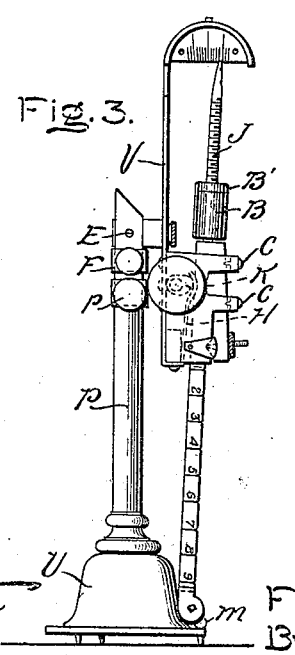
Figure 4:
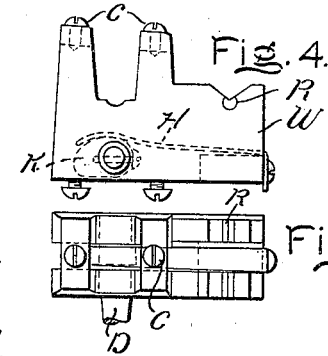
Figure 5:
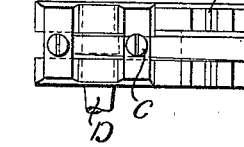

Figure 1 is a side elevation of a balance arranged in accordance with my invention. Fig. 2 is a plan view of the same. Fig. 3 is a side elevation of the balance when folded for packing. Figs. 4 and 5 are detail views of the means for lifting the pivoted beam from its bearings, and Fig. 6 is a perspective view of the pan-holder.

In the drawings, U represents a supporting-standard provided with the usual leveling-screw $u$ and carrying the hollow rod or tube P. Supported within rod P and vertically adjustable therein by means of the set-screw $p$ is the rod Q. Rigidly secured to the upper end of rod Q is the member V, which carries at one end the scale $v$ and at the other end the casting W, on which the working parts of the instrument are supported. This casting is provided with jewel-bearings R, (shown in Fig. 4,) adapted to receive the knife-edges O, which support the pivoted beam J. One arm of beam J is formed as a pointer opposite scale $v$, and the other end carries a pin L and hook $m$, from which is supported the usual thermometer plummet M. This end of beam J is calibrated and notched, as shown, to receive the usual riders X or other suitable weights.

The general construction as thus far described is the same as that of the Westphal balance. The plummet M is so proportioned in weight and volume that when it is immersed in water at a certain temperature and when a rider of a certain size is placed on the hook m the beam J will assume a horizontal position. When the plummet is immersed in another liquid, the riders are adjusted until a balance is secured and the specific gravity is thereby indicated.

In order to permit the measurement of solids, I provide a notch A at the opposite end of beam J and a hooked wire I, adapted to engage and be suspended from that notch. This wire, which is clearly shown in perspective in Fig. 6, carries supports for two pans S and T, (shown in Fig. 1,) arranged one above the other, so that one pan may be submerged in water or other liquid, while the other pan is in air. The support for the lower pan is preferably formed as a spring-clip, as indicated in Fig. 6, so that the lower pan is firmly held and prevented from floating from its support when it is being immersed. The arm J is formed with a screw-thread, as shown, and a counterweight, formed in two parts B B', is arranged to travel on the screw-thread. The screw-thread allows of a fine adjustment, and the two parts of the counterweight act as lock-nuts to hold each other in place.

The method of procedure for obtaining the specific gravity of solids with the instrument arranged as above described is as follows: The plummet is suspended from one end of the beam J and the empty pans from the other, the lower pan being immersed in water, and with the riders removed the two-part counterweight is adjusted to bring the beam to a horizontal position. The substance to be measured is then placed in the upper pan S, the riders adjusted to balance its weight, and the weight, as indicated by the riders read and recorded. The substance is then moved to the lower pan and the riders again adjusted. The difference in the two readings gives the loss of weight in water, and the specific gravity may be calculated in the usual manner. If the substance is such that its composition would be altered by immersion in water, any other suitable liquid may be employed. The specific gravity of that liquid may then be determined by immersing the plummet in it in the usual manner and this value used in calculating the specific gravity of the solid.

A single wire is employed for supporting the lower pan, and this wire is made as small as is consistent with the necessary stiffness in order that the amount of water adhering to the wire and carried above the surface, as the wire moves up and down with the oscillations of the beam, may be so small as to have no effect on the accuracy of the readings. Since the only changes between making the two readings consist in shifting the substance from the upper pan to the lower and adjusting the riders, all sources of needless error are eliminated.

In the use of the balance it is necessary frequently to lift the plummet out of the liquid in which it is immersed to remove and replace the pans or perhaps to move the instrument from one place to another. All these movements may injure the knife-edges or jewels if the pivoted beam is left on its support, and to remove the beam and replace it is equally likely to result in injury and is also inconvenient. I avoid these sources of injury by providing means for lifting the beam from its knife-edge support, locking it firmly in its raised position, and gently lowering it again into its bearings when desired. The pin D, provided with a suitable knurled head, carries the cam K, (shown in dotted lines in Figs. 1, 3, and 4,) which is normally inoperative. When it is desired to lift the beam from its bearings, the cam K is rotated, raising the spring H, the free end of which presses against the cam into engagement with beam J and lifting the beam into engagement with the pointed screws C. The beam J may be provided with pits on its upper edge adapted to be entered by the points of the screws C, so as to lock the beam firmly in its raised position, as shown in Fig. 3. If spring H were not interposed between cam K and beam J, the rotation of the cam would tend to shift the beam longitudinally; but the presence of spring H removes this shifting tendency.

For conveience in packing I so arrange the instrument that it may be folded so as to occupy a small space. For this purpose the stem or rod Q is jointed, being formed of two parts pivoted at E. A sliding collar F, provided with a suitable set-screw, securely locks the two portions of rod Q either in line with or at right angles to each other, as shown in Figs. 1 and 3, respectively. The operation of this device will be evident from an inspection of the drawings and requires no further description.

It will be obvious that my invention comprises a number of features which while I prefer to use them together may with advantage be used separately and which I desire to claim whether used together or not. Accordingly I do not desire to limit myself to the particular construction and arrangement of parts here shown, but aim in the appended claims to cover all modifications which are within the scope of my invention.

What I claim as new, and desire to secure by Letters Patent of the United States, is—

1. In a balance, a pivoted beam having one arm graduated and adapted to receive weights or riders and having its other arm screw-threaded, a plummet suspended from the graduated arm, a counterweight adapted to travel on the screw-threaded arm, a member removably suspended from the screw-threaded arm, and a plurality of pans or receptacles supported by said member.

2. In a balance, a pivoted beam having one arm graduated and adapted to receive weights or riders and the other arm screw-threaded and arranged at its outer end to form a pointer, a counterweight adapted to travel on the screw-threaded arm, a fixed scale positioned opposite the end of the screw-threaded arm, a member removably supported from said screw-threaded arm, a plurality of pans or receptacles supported by said member, and a plummet suspended from the graduated arm.

3. In a balance, a pivoted beam having one arm graduated and adapted to receive weights or riders, a member removably supported from the other arm of said beam, and provided with two supports one above the other, and two removable pans or receptacles carried by said supports, the lower support being formed as a spring-clip whereby the lower pan or receptacle is held securely in place.

4. In a balance, a pivoted beam having one arm graduated and adapted to receive weights or riders, a wire provided with a hook at its upper end adapted to engage the other arm of said beam and carrying two supports one above the other, the lower support comprising a spring-clip, and two pans or receptacles adapted to be removably carried by said supports.

5. In a balance, a pivoted beam having one arm graduated and adapted to receive weights or riders and having its other arm screw-threaded, a plummet suspended from the graduated arm, a two-part counterweight adapted to travel on the screw-threaded arm, a member removably suspended from the screw-threaded arm, and a plurality of pans or receptacles supported by said member.

6. In a balance, a pivoted beam provided with a knife-edge support, a manually-rotatable cam, a member secured against movement in a direction longitudinal with respect to said beam adapted to be moved by said cam into engagement with the under side of said beam near said knife-edge to lift the beam from its support, and means for engaging the upper side of said beam when said beam is lifted.

7. In a balance, a pivoted beam provided with a knife-edge support, a manually-rotatable cam arranged beneath said beam near said knife-edge, a leaf-spring secured substantially parallel with said beam with its free end bearing on said cam and adapted to be pressed against the lower side of said beam when said cam is rotated, and means for engaging the upper side of said beam when said beam is lifted from its support.

8. In a balance, a pivoted beam provided with a knife-edge support, a manually-rotatable cam arranged beneath said beam near said knife-edge, a leaf-spring secured substantially parallel with said beam with its free end bearing on said cam and adapted to be pressed against the lower side of said beam when said cam is rotated, and a plurality of pointed members adapted to engage the upper side of said beam when said beam is lifted from its support, the upper side of said beam being provided with pits adapted to be engaged by the points of said members.

9. In a balance, a pivoted beam provided with a knife-edge support, manually-operated means for imparting a vertical pressure on the under side of said beam near said knife-edge, and means for engaging the upper side of said beam when said beam is lifted from its support, said beam and said engaging means being provided the one with a plurality of pointed members and the other with a plurality of pits adapted to be engaged by the points of said members.

10. In a balance, a pivoted beam provided with a knife-edge support, manually-operated means for imparting a vertical pressure on the under side of said beam near said knife-edge, and a plurality of pointed members adapted to engage the upper side of said beam when said beam is lifted from its support, the upper side of said beam being provided with pits adapted to be engaged by the points of said members.

11. In a balance, a standard, a vertically-adjustable jointed rod supported thereby, said rod comprising two pivotally-connected portions, means for locking said portions in line or substantially at right angles to each other, and a pivoted beam supported by the upper of said portions.

12. In a balance, a standard comprising a vertical tube, a jointed rod adjustably supported in said tube, said rod comprising two pivotally-connected portions, means for locking said portions in line or substantially at right angles to each other, and a pivoted beam supported by the upper of said portions.

13. In a balance, a jointed stem comprising two pivotally-connected portions, a collar adjustably mounted on said stem and adapted to lock said portions in line or substantially at right angles to each other, and a pivoted beam supported on the upper of said portions.

14. In a balance, a jointed stem comprising two pivotally-connected portions, means for locking said portions in line or substantially at right angles to each other, a normally horizontal pivoted beam provided with a knife-edge and supported therefrom on the upper portion of said stem, and means for lifting said beam from its support and locking it in raised position.

15. In a balance, a jointed stem comprising two pivotally-connected portions, means for locking said portions in line or substantially at right angles to each other, and a normally horizontal pivoted beam supported by the upper portion of said stem.

16. In a balance, a supporting-stem, a member pivotally carried thereby and movable through an angle of substantially ninety degrees relative to said stem, means for locking said member in either of its extreme positions, and a normally horizontal pivoted beam supported by said member.

17. In a balance, a supporting-stem, a member pivotally carried thereby and movable through an angle of substantially ninety degrees relative to said stem, means for locking said member in either of its extreme positions, a normally horizontal pivoted beam provided with a knife-edge and supported therefrom on said member, and means carried by said member for lifting said beam from its support and locking it in its raised position.

In witness whereof I have hereunto set my hand this 4th day of February, 1905.

F. M. WILLIAMS.

Witnesses:
WM. H. HAND,
FRANK L. COLLINS.